Jan. 21, 1969 J. CAUCHOIS 3,423,682
RECEIVER SYSTEMS WITH CONSTANT FALSE ALARM RATE
Original Filed April 29, 1963
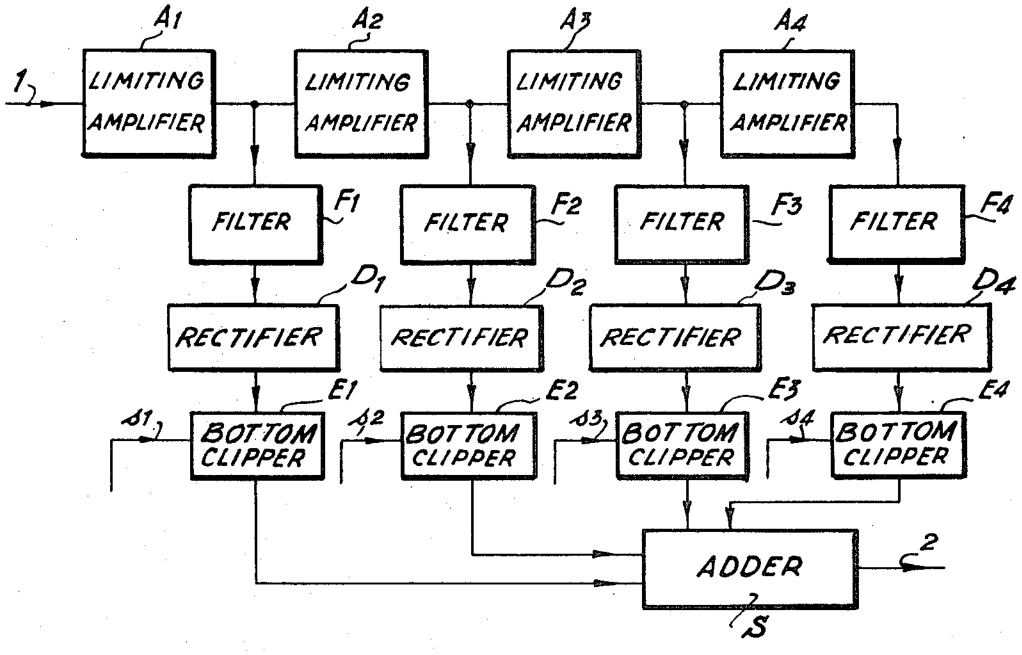

United States Patent Office 3,423,682

Patented Jan. 21, 1969

3,423,682
RECEIVER SYSTEMS WITH CONSTANT FALSE ALARM RATE

Jean Cauchois, Paris, France, assignor to CSF-Compagnie Generale de Telegraphie sans fil, a corporation of France Continuation of application Ser. No. 276,566, Apr. 29, 1963. Divided and this application Jan. 30, 1968, Ser. No. 701,791

Claims priority, application France, May 2, 1962, 896,175

U.S. Cl. 325—324 3 Claims
Int. Cl. H04b 1/10

ABSTRACT OF THE DISCLOSURE

In order that the level of the output signal of a receiver, adapted for receiving signals in an predetermined narrow-band, may vary with that of the input signal while the false-alarm rate is maintained at a desired level, the receiver comprises a chain of *n* wide-band limiting amplifiers in series and *n* narrow-band filtering bands, respectively coupled at the outputs of said amplifiers, and respectively followed by detectors and bottom clippers. The output signal is built up by the sum of the output signals of the bottom clippers.

This is a continuation of application Ser. No. 276,566, filed Apr. 29, 1963, now abandoned.

The present invention relates to receiver systems and more particularly to receiver systems wherein it is desired to make the output signal level generally increase, although not necessarily in a linear manner, with the input signal level, as is in particular the case with radar receivers.

It is an object of the invention to provide an improved receiver of this type, and more particularly a radar receiver having a constant "false-alarm rate," in the presence of noise and of most types of undesired signals, especially those which more or less partake of the nature of noise. As is known, false-alarm rate designates the average number of false information items due to the presence of undesired signals at the input of the receiver.

It is generally desirable to keep the false alarm rate at the maximum level compatible with an acceptable operation of the utilisation device, so as to maintain at a maximum the sensitivity of the receiving system.

It is known to provide in the receiver, with a view towards maintaining the false-alarm rate at the constant level thus defined, an intermediate-frequency wide-band amplifier, followed by a filter having a bandwidth which is much narrower than the bandwidth of the limiting amplifier and by a rectifier. The false-alarm rate is then a function of the ratio of the two bandwidths.

The above arrangements have, however, the drawback of practically suppressing any relationship between the level of the input signals and that of the corresponding output signals, and of being of little effect in the case of certain types of interfering signals, for example those due to echoes from clouds.

Conventional receivers of the logarithmic type are also known which have the advantage of avoiding saturation. However, they have the drawback of presenting a false-alarm rate which depends upon the level of the undesired signals at the input of the receiver.

The invention provides a receiver adapted for maintaining the above defined level relationship with an approximation which is sufficient for the radar techniques, for example an approximately logarithmic relationship, by using a plurality of stages while allowing an easy adjustment of the false-alarm rate.

According to the invention, a receiver comprises a chain of *n* wide-band limiting amplifiers in series, where *n* is an integer greater than 1, *n* arrangements respectively coupled to the outputs of said *n* amplifiers, each of said arrangements comprising in series narrow-band filtering means adapted to the frequency band of the useful signals, conventional rectifying means and bottom clipping means, adding means having *n* inputs respectively coupled to the outputs of said *n* arrangements, and an output coupled to a utilisation device, and means for applying the received signals to the input of the first limiting amplifier of said chains.

According to a preferred embodiment of the invention, the limiting amplifiers operate at the intermediate frequency.

The invention will be best understood from the following description and the appended drawing, the single figure of which illustrates a receiver according to the invention.

In the embodiment shown, there are four amplifiers.

The collected signals are applied, at the intermediate frequency level, to input 1 which feeds a circuit comprising in series four identical wide-band limiting amplifiers A1, A2, A3 and A4.

Each of the amplifiers A*i*, *i* in this example being equal to 1, 2, 3 or 4, feeds a circuit F*i* comprising a separator device which decouples its output from its input and is followed by a narrow-band filter, whose pass-band is the band of the signal which it is desired to receive.

Circuit F*i* feeds a conventional rectifier circuit D*i*, the output of which is coupled to a conventional bottom clipper E*i* of the controlled types. Clipper E*i* includes a control input to which a control voltage, derived for example from an adjustable D.C. voltage source is applied, this control voltage determining the clipping level *si* of the bottom clipper E*i*, also called base clipper. It is recalled that a bottom or base clipper is a device which transmits only the portion of an input wave lying above an amplitude boundary. Examples of bottom or base clippers may be found at page 259 of the Encyclopedic Dictionary of Electronics and Nuclear Engineering by Robert I. Sarbacher, published by Pitman and Sons, 1959, where diode clippers are shown, the amplitude boundary of which is determined by a voltage. Ecc, and consequently may be varied through varying this voltage.

The outputs of the four clippers E1 to E4 are connected to the inputs of a video frequency adding circuit S, the output signal of which is applied to the utilisation device, if necessary through other circuit elements, such as a pulse length discriminator in the case of a radar receiver.

Levels *s*1, *s*2 and *s*3 are taken equal and are sufficiently high with respect to the clipping level *s*4, taking into account the amplifier gains, for the level of the undesired noise or interference signals at the input of the adding circuit S to depend essentially upon the clipping level *s*4, levels *s*1, *s*2 and *s*3 remaining in principle constant during the use of the system, whereas level *s*4 is, if necessary, adjusted, manually or automatically, during the operation.

The system operates as follows:

According to the assumption made as to the clipping levels *s*1, *s*2, *s*3 and *s*4, the false-alarm rate at the output 2 will be determined by level *s*4, which may be varied as a function of the noise or interference signal level at the input of the receiver.

The above defined broad relationship between the levels of the input signals and of the corresponding output signals will be preserved. The number of the bottom clippers whose clipping level is below the level of a signal, i.e. the number of the bottom clippers which will deliver an output signal when an input is applied to input 1 will depend on the level of this input signal, which level in addition will be reflected by the level of the output signal of each clipper.

More precisely, below a certain level, the signals applied to input 1 will not appear at the output of any of the clippers. Above a predetermined level, they will be passed by clipper E4, the amplification being a maximum at the output of amplifier A4, and the clipping level a minimum in the clipper E4 coupled to amplifier A4. Above another level, the signals will be passed by both clippers E3 and E4, the amplification at the output of amplifier A3 being greater than the amplification at the output of amplifier A2, and the clipping level *s*3 being equal to *s*2, and so on.

It follows that, by adding the output signals of the clippers, a signal will be obtained, the level of which will be approximately a logarithmic function of the input signal level.

The use of amplifiers A*i* with wide pass-bands, i.e. pass-band much larger than the actual pass-band of the receiver as determined by the filters of the circuits F*i*, makes it possible to take advantage in each of the input circuits of adder S, of the advantages, brought about by the ratio of the bandwidths, as to the suppression of noise and interference signals.

It is to be understood that the invention is not limited to the embodiment described and illustrated. Of course, the receiver may comprise any number of amplifiers, which number is selected so as to ensure that the levels of the output signals vary as a function of the level of the input signals according to a desired law. Also, it is not necessary that the amplifiers should have the same amplifying characteristics, or that the clipping levels of the first ($n-1$) bottom clippers should be equal. The essential requirement is that the signal collected at the output of the adding circuit should be a broadly increasing function of the level of the corresponding input signal, and that the clipping levels of the first ($n-1$) bottom clippers, should be sufficiently high for the false-alarm rate to be adjustable by acting on the clipping level of the last bottom clipper.

I claim:

1. A receiver comprising: means for receiving signals; $n$ wide-band limiting amplifiers where $n$ is an integer greater than 1, said amplifiers having respective inputs and respective outputs and being connected in series; means for applying the received signals to the input of the first one of said limiting amplifiers; $n$ arrangements having respective inputs respectively coupled to said outputs of said limiting amplifiers, and respective outputs, each of said arrangements comprising in series narrow band filtering means adapted to the frequency band of the useful signals, rectifying means and bottom clipping means; and adding means having $n$ inputs respectively coupled to said outputs of said $n$ arrangements, and an output; and means for coupling said output to a utilisation device.

2. A receiver as claimed in claim 1, wherein said bottom clipping means have an adjustable clipping level.

3. A receiver as claimed in claim 1, wherein said limiting amplifiers are intermediate frequency amplifiers.

References Cited

UNITED STATES PATENTS

| | | | |
|---|---|---|---|
| 2,577,506 | 12/1951 | Belleville | 328—145 |
| 2,848,713 | 8/1958 | Cowart et al. | 325—474 X |

ROBERT L. GRIFFIN, *Primary Examiner.*

WILLIAM S. FROMMER, *Assistant Examiner.*

U.S. Cl. X.R.

325—405, 474, 477; 328—145; 343—17.1